United States Patent Office 2,972,635
Patented Feb. 21, 1961

2,972,635
HYDROGENOLYSIS OF VERBANOL TO PRODUCE ORTHO MENTHOL

Albert B. Booth, Houston, Tex., assignor to The Glidden Company, Cleveland, Ohio, a corporation of Ohio No Drawing. Filed Oct. 17, 1957, Ser. No. 690,618

1 Claim. (Cl. 260—631)

My present invention provides new compositions of matter and a method for their preparation. The new compositions of matter provided herein are useful as odor chemicals and also as substitutes for menthol in menthyl salicylate, a well known ultraviolet filter compound.

In the preparation of sunscreens of the aromatic ester type, it is generally recognized that menthyl salicylate is the screen having the optimum in physical properties. Thus, while the salicylic acid residue imparts the screening properties to the compound, some of the other desirable properties of this ester are associated with its menthyl group. The same holds true of menthyl esters of other aromatic compounds having screening properties such as the amino benzoic acid derivatives.

Unfortunately, the menthol needed to prepare these esters is an expensive compound. Recognizing the desirable properties associated with the monocyclic $C_{10}$ saturated terpene alcohol, menthol, in its application as a sun screen and in an attempt to lower the cost of sunscreens of this type, efforts have been made heretofore to substitute similar known but cheaper alcohols for the menthol. In spite of cheaper materials resulting in less expensive sunscreens, however, menthyl salicylate nevertheless, apparently continues to be the product of choice—probably because of optimum properties possessed by this compound. In reviewing the possibilities of utilizing other true terpenic derivatives similar to and isomeric with menthol, it turns out that there are no other monocyclic saturated secondary terpenic alcohols readily and economically available on the market.

An object of my invention is the provision of a new monocyclic saturated secondary terpenic alcohol.

Another object of my invention is to provide a process for preparing a new monocyclic saturated secondary terpenic alcohol from readily available raw materials.

A further object of my invention is the provision of a new odor chemical.

A still further object of my invention is to provide a terpenic alcohol, isomeric with menthol, and useful in preparing ultraviolet absorption compositions. Other objects will be recognized from a reading of my invention below.

In accomplishment of the foregoing stated objects, I have discovered that if verbanol is hydrogenated in the presence of an hydrogenation catalyst under suitable conditions of time, temperature and pressure, the resulting product is ortho menthol in nearly quantitative yield. The reaction may be shown as follows:

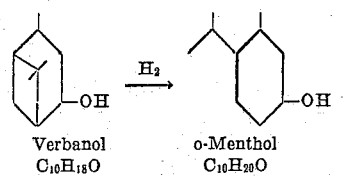

Verbanol    o-Menthol
$C_{10}H_{18}O$    $C_{10}H_{20}O$

Verbanol is a pinane alcohol which can be obtained in abundant quantity from verbenol by known hydrogenation methods. Verbenol is a derivative of α-pinene and can be prepared readily by air oxidation of α-pinene which occurs in turpentine and which is an inexpensive compound commercially available in large amounts. Thus, starting from turpentine there can be obtained α-pinene, then verbenol and finally verbanol—the starting material of my invention.

In carrying out the hydrogenolysis of verbanol to o-menthol according to my invention, it is not necessary to start with verbanol itself, however. Verbenol, verbenone and verbanone all hydrogenate readily to verbanol so that each or all of these singly or in any combination can be used as starting material. A mixture of verbanol and verbenone can be obtained by the air oxidation of α-pinene under certain conditions, and this is a suitable and economical starting material. Reduction of any of these compounds or mixtures thereof to verbanol is known to the art and occurs under milder conditions than are required for the hydrogenolysis of verbanol to o-menthol in accordance with my invention.

Although verbanol is theoretically capable of existing in twelve possible forms (eight optically active and four racemic) only a few of these have been isolated in pure form. Thus, two of the stereoisomers known are isoverbanol and neoisoverbanol, for which the following properties have been reported: Isoverbanol; M.P. 76° C., $[\alpha]_D$ +16° in benzene; neoisoverbanol; M.P. 74° C., $[\alpha]_D$ +5° in benzene.

It makes no difference which of the isomers is used in the practice of my invention, however, since they are epimerized under somewhat milder than the hydrogenolysis conditions of my invention as will be shown below. Indeed, I have found that one verbanol can be prepared from the other by the process of my invention. That is, equilibration occurs prior to hydrogenolysis and therefore in each case the product being subjected to hydrogenolysis is a mixture of isoverbanol and neoisoverbanol, equilibrated over the catalyst.

In the preferred practice of my invention, I hydrogenate verbanol in the presence of an hydrogenation catalyst under conditions whereby the cyclobutane ring is opened to yield o-menthol and thereafter I esterify the alcohol with salicylic acid or treat it with methyl salicylate to obtain o-menthol salicylate.

For the practice of my invention I have found that copper chromite is the best of the commercially available hydrogenation catalysts. Other known hydrogenation catalysts tried did not give good results. Fortunately, copper chromite is inexpensive, gives nearly quantitative yields of reaction product and accordingly is the preferred catalyst of my invention.

As in most hydrogenation processes, the variables of time, temperature, pressure, proportion of catalyst and agitation are interdependent to a degree. In general, however, I have found that hydrogen pressures of around 1800 to 2000 lbs. at temperatures of about 270° have resulted in substantially complete conversion of verbanol to o-menthol. A pressure range of from about 300 to 3,000 lbs./per sq. in., however, at temperatures of about 250 to 325° C. will also give good results. At a hydrogen pressure of about 1,000 lbs. and a temperature of 200° C. the reaction is mostly the epimerization of verbanol i.e. the equilibration of isoverbanol and neoisoverbanol.

The product resulting from hydrogenolysis is believed to be an isomeric mixture of ortho menthols since the alcohol is theoretically capable of existing in 4 geometric forms as well as d-, l-, and dl-optical isomers. Thus, as with the menthols, chromic acid oxidation will convert 2 of the isomers to the cis ketone and the other 2 to the trans ketone. Chromic acid oxidation of the o-menthols from hydrogenolysis of verbanol yields chiefly one ketone, believed to be the trans form.

The o-menthols can be esterified with salicylic acid simply by refluxing the mixture in the presence of a small amount of azeotroping agent to remove the water produced. However, it is also convenient to heat equal molecular quantities of the alcohols with methyl salicylate in the presence of catalytic quantities of sodium methoxide, whereby methanol is distilled off, and verbanol or o-menthol salicylates are formed. When 90% or more of the theoretical methanol has been distilled and collected, the product remaining in the pot is washed with water to remove the catalyst and is then vacuum distilled.

In the specific examples given below it will be understood that the conditions recited can be varied and I do not desire to be limited to the specific temperatures, pressures or reaction times disclosed.

Example 1

This example demonstrates the epimerization of isoverbanol under conditions somewhat milder than hydrogenolysis.

One hundred six grams of isoverbanol $[\alpha]_D$ —14° (C.=10, benzene) congealing point 74.5° C. and 2 grams of commercial copper chromite catalyst were rocked in a 720 cc. Aminco stainless steel hydrogenation apparatus under a hydrogen pressure of 1000 lbs./sq. in. gauge and at a temperature of 200° C. for 15 hours. No hydrogen was absorbed. After cooling, the charge was removed from the hydrogenator by dissolving it in pentane since it was crystalline when cold. After filtering off the catalyst and evaporating off the pentane under vacuum, the epimerized verbanol was recovered and had a congealing point of 63° C. Infrared spectrophotometric examination showed that except for a trace of ketone, the product consisted exclusively of isoverbanol and neoisoverbanol by comparison with authentic spectrograms of the two materials. The mixture showed $[\alpha]_D$ —10.5° (C.=10, benzene). Chromic acid oxidation yielded exclusively cis verbanone with no detectable o-menthone. The mixture of verbanols was estimated to contain about 1/3 neoisoverbanol and 2/3 isoverbanol, apparently an equilibrium mixture under the conditions employed.

Example 2

One hundred grams of isoverbanol and 10 grams of copper chromite catalyst were heated in the same apparatus of Example 1 but at 270° C. and a hydrogen pressure of 1800 to 2000 p.s.i.g. measured at 270° C. for a total of 9 hours. Approximately one mole of hydrogen was absorbed per mole of isoverbanol. The product was then allowed to cool. The product was liquid at room temperature, showed a little moisture, indicating a small side reaction and had an odor similar to o-menthol. The catalyst (still active) was filtered off and the product examined by infrared spectrophotometry. Its spectrum was found to match that of a synthetic o-menthol prepared by the hydrogenation of 3-methyl-4-isopropyl phenol, which is also believed to be a new method of preparing the o-menthol.

Chromic acid oxidation of the o-menthol gave an o-menthone spectrally identical to that prepared from one of the steroisomeric ortho menthols ex. 3-methyl-4-isopropyl phenol, believed to be the trans isomer. Both cis and trans ketone isomers prepared from 3-methyl-4-isopropyl phenol had woody odors suggestive of cedarwood oil, but no minty character, as reported in the literature. Apparently, previous preparations of o-menthone have been impure. Dehydration of the o-menthol yielded a hydrocarbon which when dehydrogenated with palladium on charcoal yielded o-cymene.

The o-menthol from hydrogenolysis of 1-verbanol was found to have a rotation taken in a 10 cm. tube of $[\alpha]_D^{25}$ +1.4, B.P. 103–109 at 10 mm. Its infrared spectrum was substantially identical to that of a fraction of ortho-menthol B.P. 105–107° C./10 mm., M.P. 24° C. produced by hydrogenation of ortho thymol at 220° C. and at a pressure of about 1400 lbs./sq. in. gauge and using 5% Raney nickel as catalyst, then fractionating by distillation at 10 mm. pressure.

Example 3

The o-menthol from the hydrogenolysis of 1-verbanol was converted to its salicylic ester and showed the following properties: $N_D^{26}$ 1.5198, $d_{25}$ 1.050 and $B._{0.6}$ 143° C.

Ortho menthol has a mild sweet odor somewhat suggestive of cloves and in this respect is unlike ordinary menthol. Because of its pleasant odor, it is useful in scenting soaps and in other perfumery applications. Being a terpenic alcohol, it is useful in the same ways as terpineol and the pine oils in the flotation of minerals, emulsification and de-emulsification, textile finishing, etc., but being secondary and saturated, it is much more stable to heat, acids, and oxidation than is terpineol. When converted to its salicylic ester it is useful as a sunscreening compound, while other aromatic and aliphatic esters, preferably the higher ones, are useful as plasticizers, cosmetic bases, lubricants and the like.

In regard to the sunscreen materials, I have also found that the verbanyl salicylates are also useful in this manner and are believed to be new compositions of matter. Either isoverbanol, neoisoverbanol or mixtures of these can be esterified with salicylic acid to produce these desirable sunscreen compounds. The following examples illustrate their preparation.

Example 4

Six grams of sodium metal was dissolved in 200 grams of isoverbanol. This was added to a mixture of 400 grams of methyl salicylate and 400 grams of isoverbanol. About 200 cc. of dry toluene was added and the mixture was refluxed at atmospheric pressure taking methanol off at the head of the column. The reaction was practically complete in 12 hours as determined by the fact that almost the quantitative calculated amount of methanol had been removed. The product was cooled and washed to remove catalyst and then distilled. After taking off toluene and a little unreacted material, verbanol salicylate distilled at about 153 to 156° C. at 0.4 to 0.5 mm. Hg. The yield was almost quantitative.

Example 5

One gram of sodium metal was added to a mixture of 100 grams of toluene and 90 grams of a mixture of isoverbanol and neoisoverbanol produced as in Example 1. The mixture was refluxed to dissolve the sodium and was then cooled. Sixty-six grams of methyl salicylate was then added and the mixture was heated under a fractionating column in order to remove methanol as it was produced by ester interchange. After heating for about 10 hours there seemed to be little methyl salicylate left in the reacting mixture and it was therefore steam distilled to remove toluene and excess verbanol. The residue from the steam distillation was then fractionated to recover 96 grams of distillate boiling at 140.5 to 141.5 at approximately 0.4 mm. Hg. This mixture of the two isomeric verbanol salicylates crystallized when it was seeded with isoverbanol salicylate prepared as in Example 4.

Thus in Example 4, conversion of the starting verbanol to its salicylic ester yielded a product that closely resembled menthyl salicylate as long as it remained super cooled. However, it finally crystallized and showed a congealing point of 50° C. The salicylates from Example 5, i.e. from the mixed verbanols from epimerization, melted lower but still above room temperature. Since the verbanyl salicylates are compatible with and soluble in menthyl and o-menthyl salicylates and a wide variety of solvents and fixed oils, the crystallinity exhibited by verbanyl salicylate does not mitigate against its use in formulated products such as sunscreen lotions.

Having thus described my invention, I claim:

A process for converting verbanol which comprises heating said verbanol at elevated temperatures of from 250 to 325° C. and pressures in the range of from 300 to 3000 p.s.i. in the presence of hydrogen and a copper chromite catalyst and recovering therefrom ortho menthol as a reaction product.

References Cited in the file of this patent

UNITED STATES PATENTS

| | | |
|---|---|---|
| 779,377 | Seifert et al. | Jan. 3, 1905 |
| 979,416 | Blieberger | Dec. 27, 1910 |
| 1,776,667 | Schollkopf et al. | Sept. 23, 1930 |
| 1,932,131 | Blagden et al. | Oct. 24, 1933 |
| 2,453,110 | Bain et al. | Nov. 9, 1948 |
| 2,481,845 | King | Sept. 13, 1949 |

OTHER REFERENCES

Weinlaus: Chem. Ab., vol. 24 (1930), p. 1635.